United States Patent
Salter et al.

(10) Patent No.: US 12,397,693 B2
(45) Date of Patent: Aug. 26, 2025

(54) VEHICLE CONSOLE ASSEMBLY

(71) Applicant: Ford Global Technologies, LLC, Dearborn, MI (US)

(72) Inventors: Stuart C. Salter, White Lake, MI (US); Dustin Shedlarski, Commerce Township, MI (US); Ryan Welch, Ottawa Lake, MI (US); Paul Kenneth Dellock, Northville, MI (US); Annette Lynn Huebner, Highland, MI (US); Aaron Johnson, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 301 days.

(21) Appl. No.: 18/079,955

(22) Filed: Dec. 13, 2022

(65) Prior Publication Data

US 2024/0190321 A1   Jun. 13, 2024

(51) Int. Cl.
  *B60N 3/00* (2006.01)
  *B60N 2/75* (2018.01)
  (Continued)

(52) U.S. Cl.
  CPC .............. *B60N 3/002* (2013.01); *B60N 2/79* (2018.02); *B60Q 3/225* (2017.02); *B60R 7/04* (2013.01);
  (Continued)

(58) Field of Classification Search
  CPC .......... B60N 3/001; B60N 3/002; B60N 2/79; B60N 2/793; B60N 2/773; B60N 2/777;
  (Continued)

(56) References Cited

U.S. PATENT DOCUMENTS

| 5,547,247 A | 8/1996 | Dixon |
| 6,032,587 A * | 3/2000 | Salenbauch ............ B60N 3/002 108/44 |

(Continued)

FOREIGN PATENT DOCUMENTS

| CN | 114987309 A * | 9/2022 | ............. B60N 3/001 |
| DE | 10258305 A1 * | 7/2004 | ............. B60N 2/468 |

(Continued)

OTHER PUBLICATIONS

Mueller et al. (DE 102012015039 A1), machine translation (Year: 2014).*
Wang et al. (CN 114987309 A), machine translation (Year: 2022).*

*Primary Examiner* — Amy R Weisberg
*Assistant Examiner* — Wenwei Zhuo
(74) *Attorney, Agent, or Firm* — Vichit Chea; Price Heneveld LLP (57) ABSTRACT

A vehicle console system includes a body having first and second sidewalls. Each of the first and second sidewalls defines a rail along an inner surface thereof. A support bar slidably engages the rails. The support bar defines a track. A cover assembly is operably coupled to the support bar. The cover assembly includes a base panel coupled to the support bar via a connector assembly and a deployable panel rotatably coupled to the base panel. The cover assembly is configured to translate along a first movement path with the support bar along the rails and a second movement path along the track of the support bar. The cover assembly is configured to rotate along a third movement path between a first side position and a second side position.

20 Claims, 7 Drawing Sheets

(51) Int. Cl.
  *B60Q 3/225* (2017.01)
  *B60R 7/04* (2006.01)
  *B60R 11/02* (2006.01)
  *B60R 11/04* (2006.01)
  *B60R 11/00* (2006.01)

(52) U.S. Cl.
  CPC .......... *B60R 11/0229* (2013.01); *B60R 11/04* (2013.01); *B60R 2011/0007* (2013.01)

(58) Field of Classification Search
  CPC ... B60R 7/04; B60R 2011/0007; A47B 5/006; B60Q 3/225; B60Q 3/233; B64D 11/063
  USPC .................. 296/37.8, 24.34; 108/44; 701/36; 297/145
  See application file for complete search history.

(56) References Cited

U.S. PATENT DOCUMENTS

| | | | |
|---|---|---|---|
| 6,220,660 B1* | 4/2001 | Bedro | B60N 2/79 297/146 |
| 6,793,281 B2 | 9/2004 | Duerr | B60N 2/753 297/173 |
| 7,293,507 B2 | 11/2007 | DePue et al. | |
| 7,798,072 B2* | 9/2010 | Becker | A47C 7/70 297/145 |
| 8,540,297 B2 | 9/2013 | Browne et al. | |
| 9,896,011 B2* | 2/2018 | Kong | B60N 3/002 |
| 10,457,170 B2 | 10/2019 | Line et al. | |
| 10,457,171 B2 | 10/2019 | Line et al. | |
| 10,919,426 B1* | 2/2021 | Campagnone | B60R 7/04 |
| 10,926,880 B1* | 2/2021 | Mayne | A47B 31/06 |
| 12,043,155 B2* | 7/2024 | Thomas | B60N 2/77 |
| 2010/0201147 A1* | 8/2010 | Jones | B60N 2/777 296/24.34 |
| 2010/0244478 A1* | 9/2010 | DePue | B60N 2/773 296/37.8 |
| 2013/0008930 A1 | 1/2013 | Hipshier et al. | |
| 2014/0207333 A1* | 7/2014 | Vandivier | B60N 2/0278 701/36 |
| 2018/0072209 A1 | 3/2018 | Farooq et al. | |
| 2020/0055436 A1* | 2/2020 | Garcia Sanchez | B60R 21/026 |
| 2023/0150400 A1* | 5/2023 | Kim | B60N 2/143 701/49 |
| 2024/0278701 A1* | 8/2024 | Stout, II | B60N 2/79 |

FOREIGN PATENT DOCUMENTS

| | | | | |
|---|---|---|---|---|
| DE | 102012015039 A1 * | 1/2014 | | B60Q 3/74 |
| DE | 102019120974 A1 * | 2/2021 | | |
| DE | 102019130142 A1 | 5/2021 | | |
| JP | 2005193855 A | 7/2005 | | |
| JP | 5715268 B2 | 5/2015 | | |
| WO | 2012174613 A1 | 12/2012 | | |

* cited by examiner

VEHICLE CONSOLE ASSEMBLY

FIELD OF THE DISCLOSURE

The present disclosure generally relates to a console assembly. More specifically, the present disclosure relates to a console assembly for a vehicle.

BACKGROUND OF THE DISCLOSURE

Many vehicles include center consoles. The center consoles often provide storage for housing items. Additionally, the center consoles often have a padded layer on a top thereof.

SUMMARY OF THE DISCLOSURE

According to at least one aspect of the present disclosure, a vehicle console system includes a body having first and second sidewalls. Each of the first and second sidewalls defines a rail along an inner surface thereof. A support bar slidably engages the rails. The support bar defines a track. A cover assembly is operably coupled to the support bar. The cover assembly includes a base panel coupled to the support bar via a connector assembly and a deployable panel rotatably coupled to the base panel. The cover assembly is configured to translate along a first movement path with the support bar along the rails and a second movement path along the track of the support bar. The cover assembly is configured to rotate along a third movement path between a first side position and a second side position.

According to another aspect of the present disclosure, a vehicle console assembly includes a body defining a storage cavity between first and second sidewalls. A support bar is coupled to each of the first and second sidewalls. The support bar defines a track extending between the first and second sidewalls. A cover assembly is operably coupled to the support bar. The cover assembly includes a first panel. A second panel is rotatably coupled to the first panel. The second panel is operable between a folded state and a deployed state. A connector assembly is coupled to a lower surface of the first panel and extends through the track of the support bar. The cover assembly is configured to rotate in a first direction from a center position to a first side position and in a second direction from the center position to a second side position. The cover assembly is configured to translate along the track.

According to another aspect of the present disclosure, a console assembly for a vehicle includes a body having sidewalls. Each sidewall defines a rail. A support bar slidably engages the rails. The support bar defines a track. A cover assembly is operably coupled to the support bar. A connector assembly is coupled to the cover assembly and engages the support bar. The cover assembly is configured to translate along a first movement path with the support bar via the rails, translate along a second movement path along the track via the connector assembly, and rotate about a vertical axis along a third movement path via the connector assembly.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
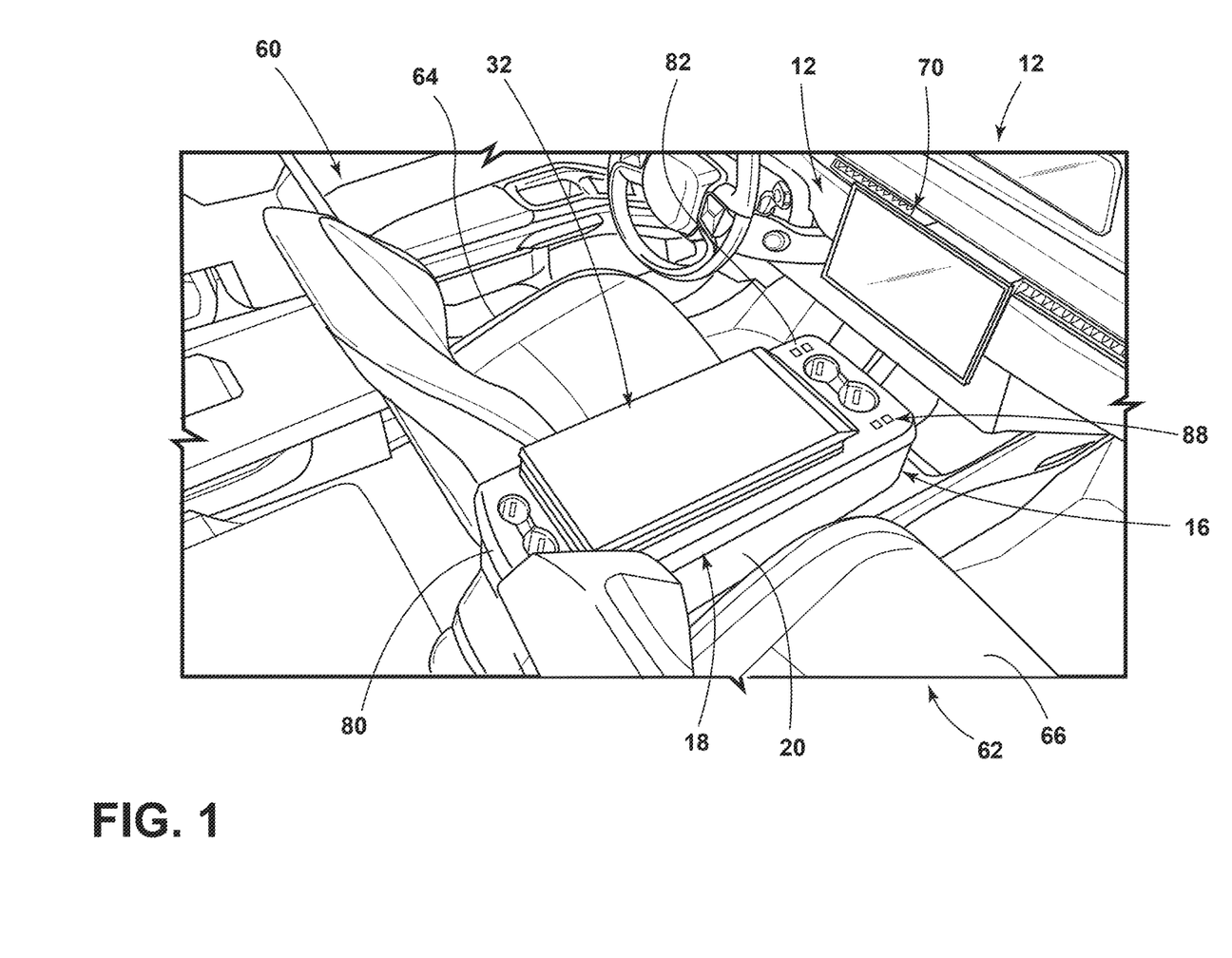
FIG. 1 is a side perspective view of a console assembly within an interior compartment of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring to FIGS. 1-11, reference numeral 10 generally designates a console system 10 for a vehicle 12 which includes a console assembly 14. The console assembly 14 includes a body 16 having first and second sidewalls 18, 20 where each of the first and second sidewalls 18, 20 defines a rail 22, 24 on an inner surface 26 thereof. A support bar 28 slidably engages the rails 22, 24 and defines a track 30. A cover assembly 32 is operably coupled to the support bar 28. The cover assembly 32 includes a base panel 34 coupled to the support bar 28 via a connector assembly 36 and a deployable panel 38 rotatably coupled to the base panel 34. The cover assembly 32 is configured to translate along a first movement path 40 with the support bar 28 along the rails 22, 24 and a second movement path 42 along the track 30 of the support bar 28. The cover assembly 32 is also configured to translate along a third movement path 44, rotating in a first direction to a first side position and in a second direction to a second side position.

With reference to FIG. 1, the vehicle 12 includes an interior compartment 60 with at least one seating row 62, including a first seating assembly 64 and a second seating assembly 66. Any practicable number of seating rows 62 may be included in the vehicle 12 without departing from the teachings herein. The illustrated seating row 62 is a front seating row 62 with the first seating assembly 64 being a driver seat 64 and the second seating assembly 66 being a passenger seat 66. In the illustrated example, the driver seat 64 and the passenger seat 66 are disposed proximate to a dashboard having a center stack 70 and are separated by the console assembly 14.

Figure 2:
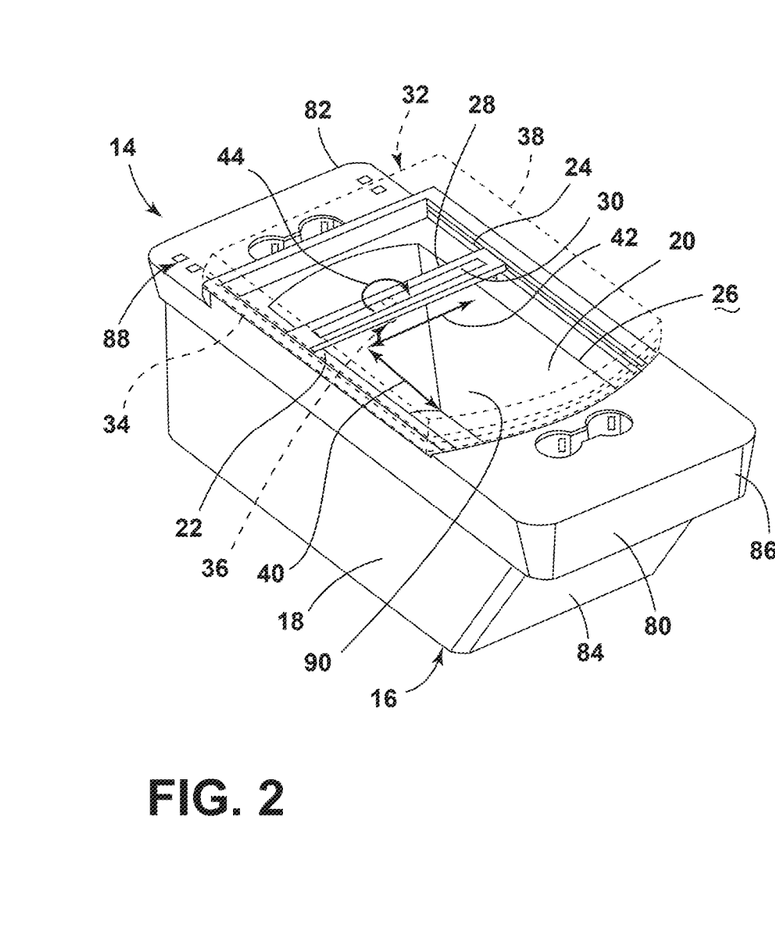
FIG. 2 is a side perspective view of a console assembly with a movable cover assembly in phantom, according to the present disclosure.

Referring still to FIG. 1, as well as FIG. 2, the console assembly 14 includes the body 16 having a first end 80, which is generally a vehicle-rearward end, and a second end 82, which is generally a vehicle-forward end. The body 16 includes a lower base 84 configured to engage a vehicle body and an upper rim 86 coupled to the lower base 84. In the illustrated configuration, the upper rim 86 generally has a length and a width greater than a length and a width of the lower base 84. Additional or alternative configurations of the body 16 are contemplated without departing from the teachings herein.

In various examples, the console assembly 14 includes control buttons 88, which are generally located at the vehicle-forward second end 82. The second end 82 may have a recessed region, offset from the remainder of a surface of the upper rim 86 to allow space for the control buttons 88. The recessed region also lowers the control buttons 88 to provide space for movement of the cover assembly 32 as described herein. The console assembly 14 may also include additional features such as a support surface at the first end 80, cup holders, etc.

Referring still to FIGS. 1 and 2, the console assembly 14 defines a storage cavity 90 between the opposing sidewalls 18, 20. The storage cavity 90 may be covered by the cover assembly 32 and accessed by moving the cover assembly 32 relative to the upper rim 86 as described further herein.

In the illustrated configuration, the storage cavity 90 is wider at an opening into the storage cavity 90 compared to a bottom of the storage cavity 90. The wider opening may provide increased access into lower portions of the storage cavity 90, as well as provide a location for the rails 22, 24 on the sidewalls 18, 20 that does not substantially impinge storage space provided by the storage cavity 90.

Figure 3:
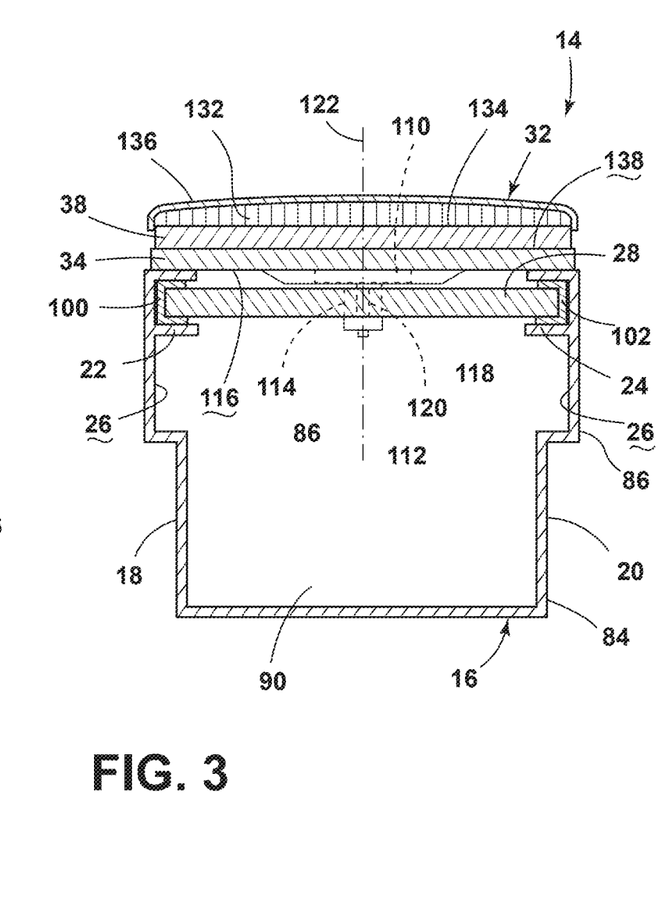
FIG. 3 is a cross-sectional view of a console assembly with a movable cover assembly, according to the present disclosure.

Referring still to FIG. 2, as well as FIG. 3, the cover assembly 32 is configured to move along multiple movement paths 40, 42, 44 relative to the body 16. The sidewalls 18, 20 each define the respective rail 22, 24 along the inner surface 26 thereof proximate to the opening into the storage cavity 90. The rails 22, 24 generally extend between the first and second ends 80, 82 in the fore-aft direction within the vehicle 12 (FIG. 1). The rails 22, 24 extend from the inner surface 26 of the sidewalls 18, 20 into the storage cavity 90. The rails 22, 24 may not extend past the inner surfaces 26 of the sidewalls 18, 20 where the sidewalls 18, 20 define the narrower width of the storage cavity 90 (e.g., the lower portion). The body 16, including the rails 22, 24, is generally molded from a 30% glass filled polypropylene. The rails 22, 24 are molded into the sidewalls 18, 20 and generally extend the entire length of the storage cavity 90 and/or the opening into the storage cavity 90.

The support bar 28 is configured to extend across the storage cavity 90 and engage each of the rails 22, 24 defined by the sidewalls 18, 20. In this way, the support bar 28 extends in a cross-car direction between the rails 22, 24. The support bar 28 is generally constructed of metal or metal alloy materials, such as stainless steel. The support bar 28 is slotted, such that it defines the track 30, which extends therethrough. The track 30 extends in the cross-car direction between the first and second sidewalls 18, 20, extending generally normal to the rails 22, 24.

In order to slidably engage the rails 22, 24, the support bar 28 is coupled with sliders 100, 102 at each opposing end. The sliders 100, 102 are configured to slidably engage with the molded rails 22, 24, respectively, and are positioned between the rails 22, 24 and the support bar 28. Generally, the engagement between the sliders 100, 102 and the rails 22, 24 is a frictional engagement such that a manual force applied to the cover assembly 32 allows the sliders 100, 102 to translate along the rails 22, 24 and remain in a selected position when manual force is not being applied. In various aspects, the sliders 100, 102 are extruded polyoxymethylene (POM).

Referring still to FIGS. 2 and 3, the cover assembly 32 includes the base panel 34 and the deployable panel 38. The panels 34, 38 are operably coupled to the support bar 28, allowing the panels 34, 38 to translate in the fore-aft direction with the support bar 28 along the rails 22, 24 along the first movement path 40. The connector assembly 36 is configured to couple the base panel 34 to the support bar 28, as well as allow translation along the track 30 along the second movement path 42 and rotation along the third movement path 44. The connector assembly 36 generally includes an attachment bracket 110, a fastener 112, and a bushing 114. In various aspects, the base panel 34 is coupled with the support bar 28 via the fastener 112 or a fastener assembly 112, such as a screw and a washer. The screw and washer are configured to retain the engagement between the base panel 34 and the support bar 28 and still allow movement along the track 30. The base panel 34 is substantially planar and is generally molded of a composite material, such as a composite material that is about 20% recycled carbon fiber and nylon 6. It is contemplated that other plastic composites may be utilized without departing from the teachings herein.

The attachment bracket 110 is coupled to a lower surface 116 of the base panel 34. In non-limiting examples, the attachment bracket 110 may be a zinc die cast attachment bracket 110. The attachment bracket 110 is generally insert molded to the lower surface 116 of the base panel 34. In such examples, the attachment bracket 110 is overmolded to the lower surface 116 of the base panel 34 via a covering 118, which is generally constructed of plastic materials. The attachment bracket 110 includes a shaft 120 that extends away from the base panel 34. When the base panel 34 is coupled to the body 16 via the support bar 28, the shaft 120 of the attachment bracket 110 extends through the track 30 toward a bottom of the storage cavity 90.

The bushing 114 is placed over the shaft 120 of the attachment bracket 110, allowing the panels 34, 38 to rotate about a vertical axis 122. The bushing 114 generally allows rotational movement +/−90 degrees in two directions and, therefore, allows about 180 degrees of rotation overall. The bushing 114 may be a molded POM bushing 114.

The connector assembly 36 is configured to translate in along the track 30 in response to an applied manual force, generally applied by the user. This allows the cover assembly 32 to translate in the cross-car direction along the second movement path 42. A frictional interference or engagement between the connector assembly 36 and the support bar 28 allows the movement along the track 30 and retains the cover assembly 32 in the selected position in the absence of the applied force.

Referring still to FIGS. 2 and 3, the deployable panel 38 of the cover assembly 32 is rotatably coupled to the base panel 34. The deployable panel 38 has a similar length and width relative to the base panel 34, though may be different sizes and shapes without departing from the teachings herein. For example, the deployable panel 38 may have an increased thickness compared to the base panel 34. The deployable panel 38 is generally injection molded from a composite material, which is about 20% recycled carbon fiber and nylon 6. Other plastic composites may be utilized without departing from the teachings herein.

The deployable panel 38 is rotatably coupled to the base panel 34 via hinges 130. The hinges 130 may be living hinges 130 or hinge assemblies 130 coupled to each of the panels 34, 38. Generally, in when the cover assembly 32 is in a center position as illustrated in FIGS. 2 and 3, the hinges 130 are disposed at vehicle-forward edges of the panels 34, 38. The hinges 130 allow the deployable panel 38 to rotate between a folded state and a deployed state as described herein.

A padding 132 may be coupled to the deployable panel 38. The padding 132 covers one side 134 of the deployable panel 38, which is an upper side of the deployable panel 38 when in the folded state and a lower side when in the deployed state. Generally, the padding 132 is a polyurethane foam pad, which may be overmolded onto the deployable panel 38 by a cover 136. The cover 136 may be leather, film, plastic, fabric, vinyl, etc. The cover 136 may extend over the padding 132, as well as edges of the deployable panel 38. The padding 132 is generally configured to provide an armrest for occupants of the seating assemblies 64, 66 (FIG. 1).

Figures 4, 5:
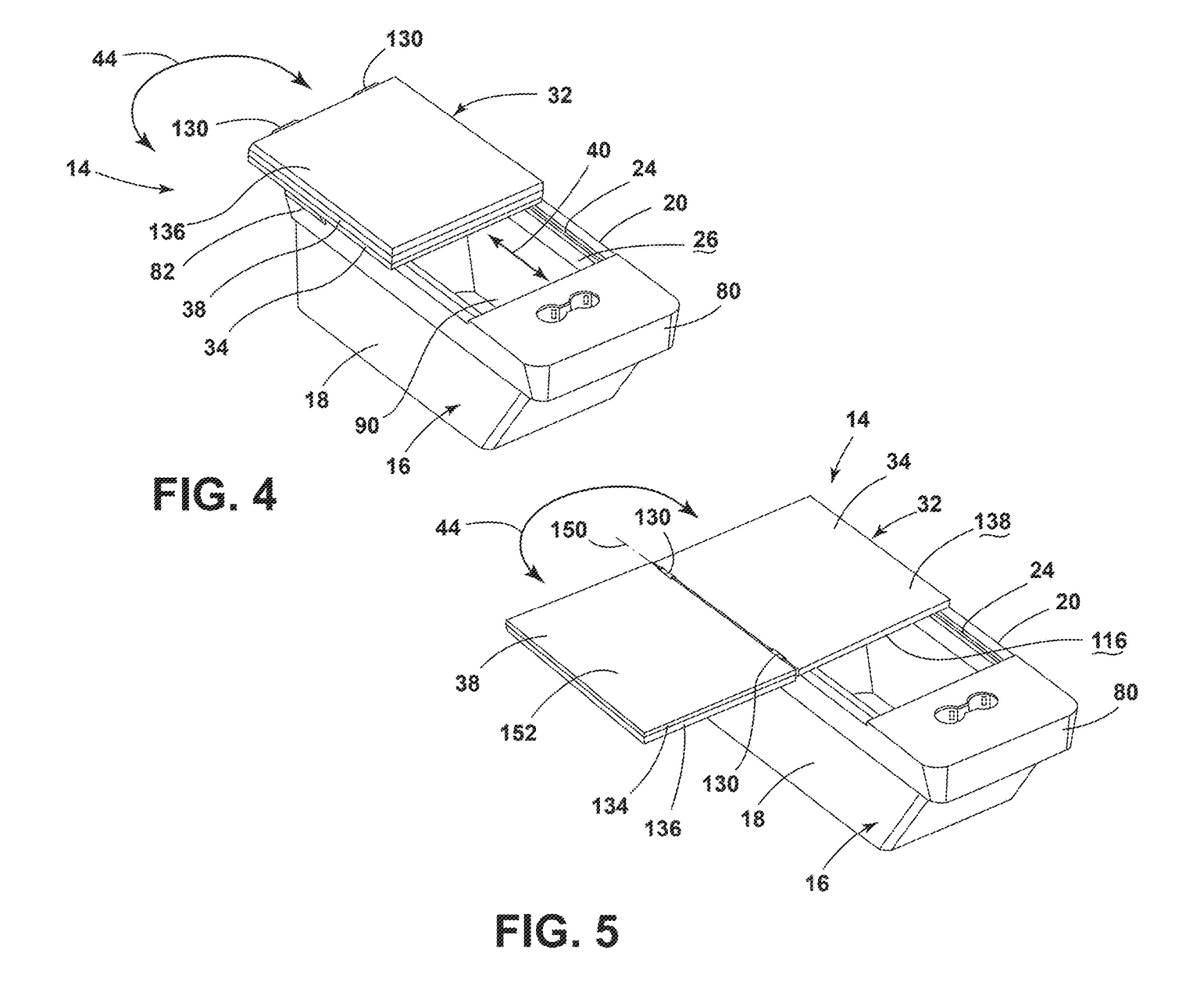
FIG. 4 is a side perspective view of a console assembly with a cover assembly moved along a first movement path, according to the present disclosure.
FIG. 5 is a side perspective view of a console assembly with a cover assembly in a first side position and a deployed state, according to the present disclosure.

Referring to FIG. 4, the console assembly 14 is configured to translate along the first movement path 40 defined by the rails 22, 24, which is in the fore-aft direction between the first and second ends 80, 82 of the body 16. The first movement path 40 may be advantageous for moving the cover assembly 32 to access the storage cavity 90, as well as for adjusting the cover assembly 32 relative to occupants of the seating assemblies 64, 66 as described herein. The cover assembly 32 may extend at least partially over the storage cavity 90 as the cover assembly 32 translates and/or is positioned at ends of the rails 22, 24. Alternatively, the storage cavity 90 may be free of the cover assembly 32 when the cover assembly 32 is at certain positions such that the opening to the storage cavity 90 is fully accessible (e.g., the cover assembly 32 is moved adjacent to the storage cavity 90 in the fore or aft direction).

Referring still to FIG. 4, as well as FIG. 5, the cover assembly 32 is operable between the folded armrest state as illustrated in FIG. 4, and a deployed or tray state, as illustrated in FIG. 5. When in the folded state, the deployable panel 38 is generally positioned over and rests on the base panel 34. Depending on the configuration of the deployable panel 38, the deployable panel 38 generally covers an entire upper surface 138 of the base panel 34. When in the folded state and when the connector assembly 36 is in a center of the track 30 on the support bar 28, the panels 34, 38 generally extend from the first sidewall 18 to the second sidewall 20 over the storage cavity 90. Further, when in the center position, the folded state, and in the center of the track 30, side edges of the panels 34, 38 align with the rails 22, 24.

When in the deployed state, the deployable panel 38 rotates about 180 degrees about a horizontal axis 150 defined by the hinges 130. In this way, when in the deployed state, the deployable panel 38 is disposed adjacent to the base panel 34. Once in the deployed state, the deployable panel 38 has a surface 152 that aligns with the upper surface 138 of the base panel 34 to form a tray or table surface. The hinges 130 are generally positioned between or below the tray surface defined by the adjacent panels 34, 38 so as not to impinge on the generally coplanar or flat table or tray surface defined by the deployed cover assembly 32. The padding 132 disposed on the deployable panel 38 is then on the lower side of the deployable panel 38.

Figures 6, 7:
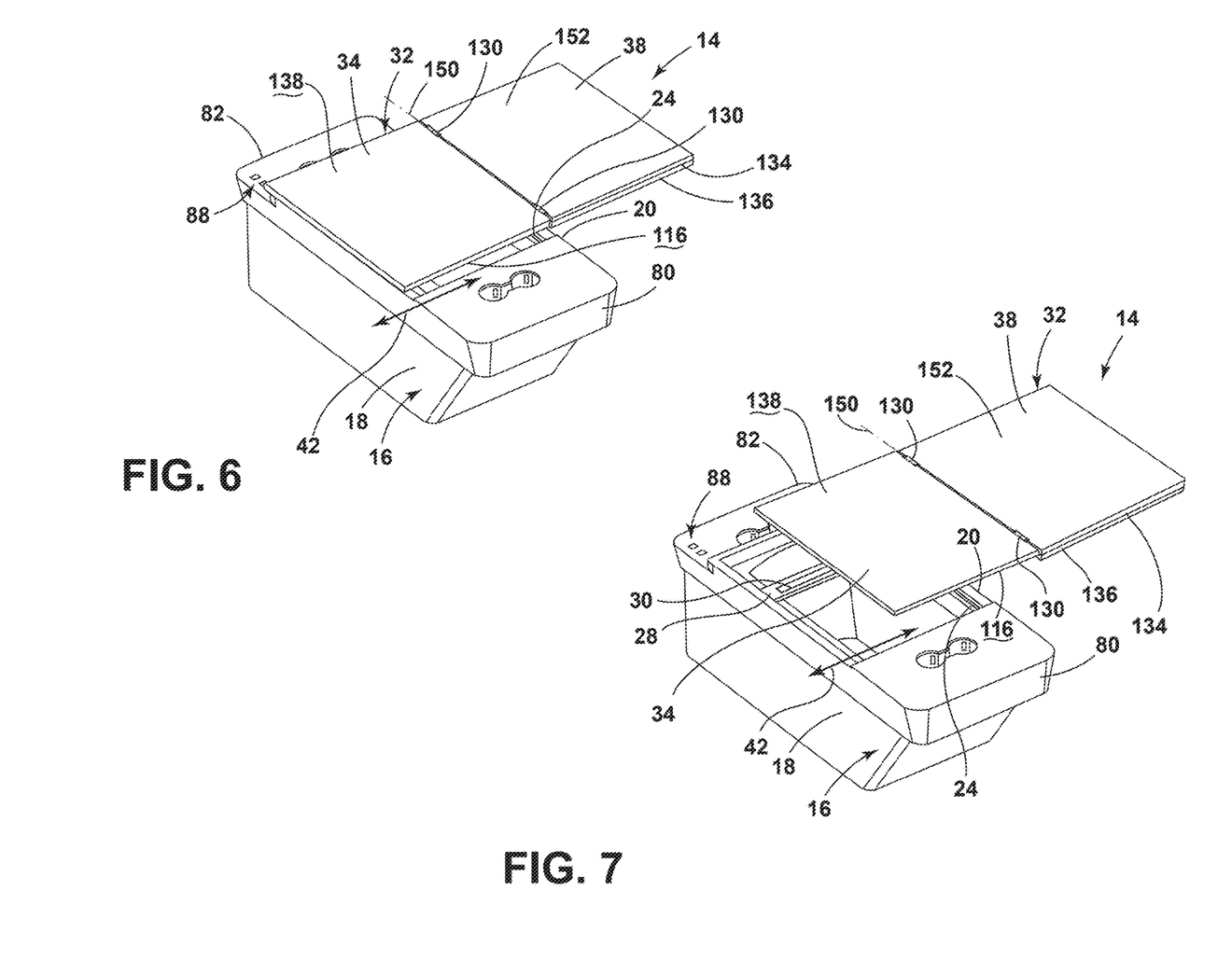
FIG. 6 is a side perspective view of a console assembly with a cover assembly in a second side position and a deployed state, according to the present disclosure.
FIG. 7 is a side perspective view of a console assembly with a cover assembly in a second side position and a deployed state moved along a second movement path, according to the present disclosure.

Referring still to FIGS. 4 and 5, as well as FIG. 6, the cover assembly 32 is operable between the center position where the hinges 130 are at the vehicle-forward or console-forward edges of the panels 34, 38, as illustrated in FIG. 4, the first side position, as illustrated in FIG. 5, and the second side position, as illustrated in FIG. 6. In each of the center position, the first side position, and the second side position, the cover assembly 32 may be in either of the folded state or the deployed state and may be disposed at any position along the rails 22, 24 and/or the track 30. In this way, the cover assembly 32 may rotate to either of the side positions to provide a different configuration for the armrest or to provide the tray surface for different occupants.

The cover assembly 32 is configured to translate along the third movement path 44 as the cover assembly 32 rotates between the center position and the side positions. The cover assembly 32 is configured to rotate about the vertical axis 122 while the panels 34, 38 translate along a horizontal plane. The cover assembly 32 is configured to rotate up to about 90 degrees in the first direction from the center position, where the hinges 130 are at vehicle-forward edges, to the first side position, where the hinges 130 are disposed proximate the first sidewall 18 and the first seating assembly 64 (e.g., the driver seat 64). The first side position may be any position between the center position, considered about zero degrees of rotation, and the full rotation of about 90 degrees in the first direction. The cover assembly 32 may be utilized in the folded state or may be adjusted to the deployed state when in the first side position.

When in the deployed state in the first side position, the base panel 34 extends at least partially over the storage cavity 90 and the deployable panel 38 extends at least partially over the first seating assembly 64. Depending on the position of the connector assembly 36 relative to the track 30, the deployable panel 38 may extend partially over the storage cavity 90 or may be disposed adjacent to an outer surface of the first sidewall 18 adjacent to the body 16. In the deployed state in the first side position, the cover assembly 32 provides the tray or table surface primarily or fully for the occupant in the first seating assembly 64. While the first seating assembly 64 is illustrated as the driver seat 64, it is contemplated that the deployed state of the cover assembly 32 is utilized when the vehicle 12 is in a stationary condition. However, it is anticipated that technology or the regulatory framework may evolve in the future to where using the cover assembly 32 as a tray or table in a moving vehicle 12 becomes safe and permissible. Accordingly, the use and function of the cover assembly 32 may align with any current technology and regulatory framework.

Referring still to FIG. 6, the cover assembly 32 is configured to rotate up to about 90 degrees in the second direction from the center position to the second side position, where the hinges 130 are disposed proximate to the second sidewall 20 and the second seating assembly 66 (e.g., the passenger seat 66). The second side position may be any position between the center position, considered about zero degrees of rotation, and the full rotation of about 90 degrees in the second direction. Similar to the first side position (FIG. 5), when in the second side position, the cover assembly 32 may be utilized in the folded state to provide a different configuration for the armrest and in the deployed state to provide the tray surface primarily or fully for the occupant of the second seating assembly 66. The base panel 34 extends at least partially over the storage cavity 90 and the deployable panel 38 extends at least partially over the second seating assembly 66, depending on the position of the connector assembly 36 relative to the track 30.

Referring to FIG. 7, the cover assembly 32 is also configured to translate along the second movement path 42 along the track 30 when in the first and second side positions. While the cover assembly 32 is illustrated in FIG. 7 in the first side position, it is understood that the description herein is also applicable for when the cover assembly 32 is in the second side position. Whether in the folded state or the deployed state, the cover assembly 32 is configured to move in the cross-car direction along the track 30 of the support bar 28. This allows the tray surface to be more fully positioned over the first seating assembly 64 as well as the occupant in the first seating assembly 64.

Additionally, when in the first side position and in the deployed state, the cover assembly 32 being adjusted along the track 30 toward the second seating assembly 66 may provide a more central tray or table surface that may be utilized by occupants in either or both of the seating assemblies 64, 66. This central tray or table surface may also be available by adjusting the cover assembly 32 to the second side position in the deployed state and moving the cover assembly 32 along the track 30 toward the first seating assembly 64.

Referring to FIGS. 4-7, the cover assembly 32 is configured to translate along the three movement paths 40, 42, 44, which are generally defined along the same horizontal plane (i.e., a single plane). In this way, the cover assembly 32 may translate fore-and-aft, translate in the cross-car direction, and rotate between the side positions to provide a variety of positions for the cover assembly 32. The cover assembly 32 may be moved along any of the movement paths 40, 42, 44 in combination with one another. Accordingly, the cover assembly 32 can be moved along the rails 22, 24, along the track 30, rotated about the vertical axis 122, and combinations thereof. Further, while moving along any of the movement paths 40, 42, 44, the cover assembly 32 may be in the folded state or the deployed state. This configuration provides customizable positioning of the cover assembly 32 for both the folded cover assembly 32 providing the armrest and the deployed cover assembly 32 providing the tray surface.

Figures 8, 9:
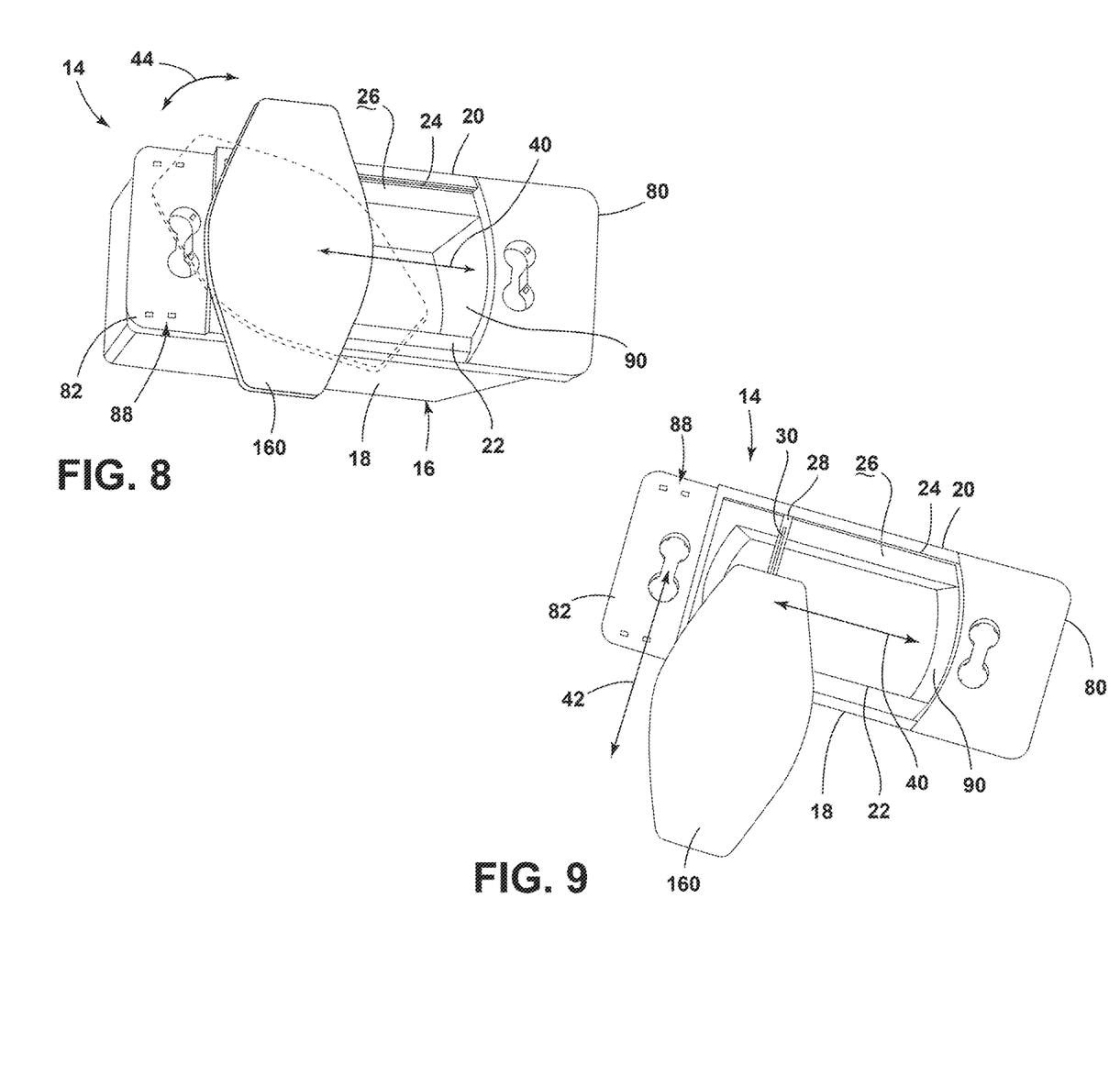
FIG. 8 is a top perspective view of a console assembly with a cover assembly having an elongated panel rotatable along a third movement path, according to the present disclosure.
FIG. 9 is a top perspective view of a console assembly with a cover assembly having an elongated panel moved along a second movement path, according to the present disclosure.
Figure 10:
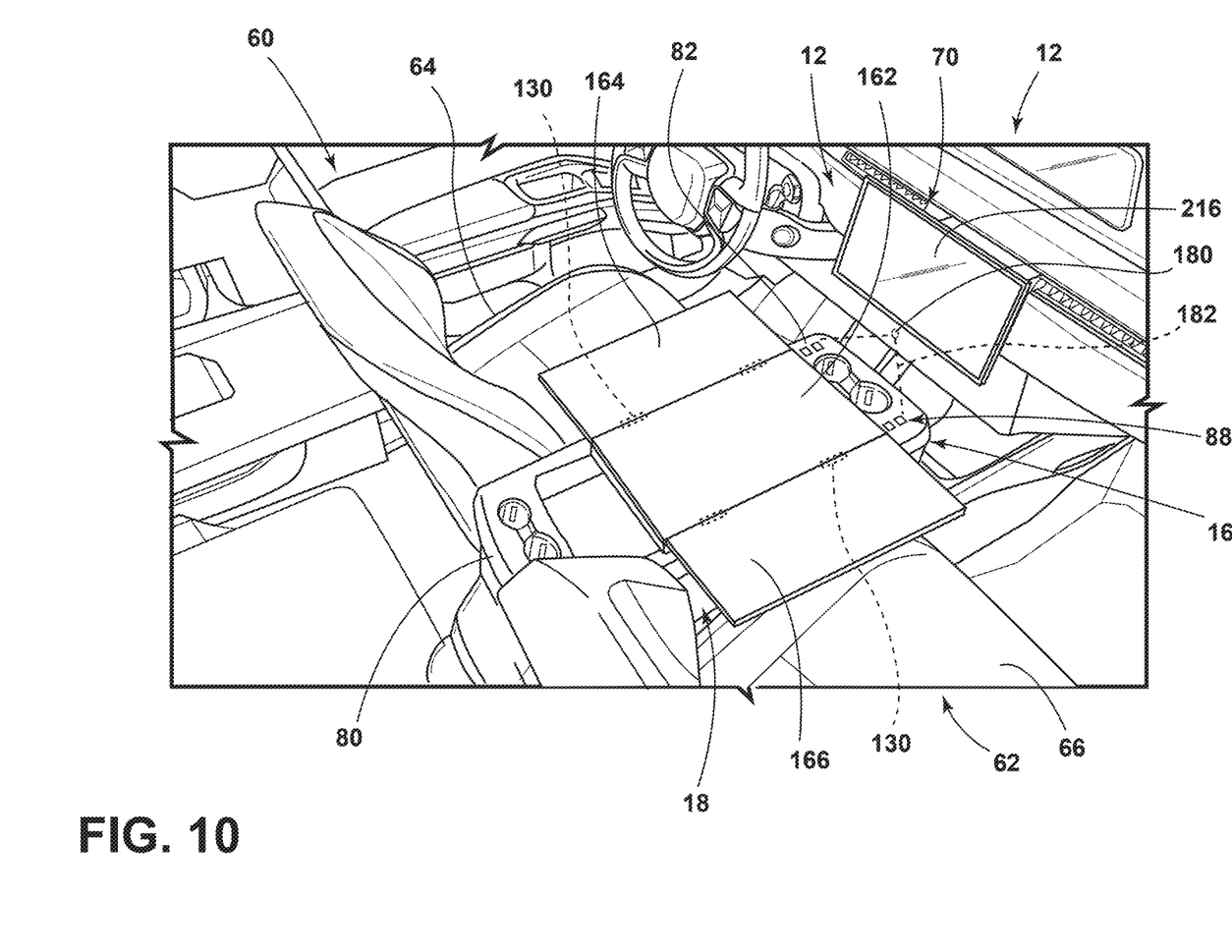
FIG. 10 is a side perspective view of a console assembly with a three-panel cover assembly in a deployed state, according to the present disclosure.

Referring to FIGS. 8-10, the cover assembly 32 may have a variety of configurations that each may translate along the first, second, and third movement paths 40, 42, 44. For example, as illustrated in FIGS. 8 and 9, the cover assembly 32 may include a single elongated panel 160. The elongated panel 160 may have tapering ends, which may be advantageous during rotation of the elongated panel 160 along the third movement path 44 while occupants are in the seating assemblies 64, 66. A longitudinal extent of the elongated panel 160 may extend in the fore-aft direction to substantially cover the storage cavity 90 and may extend in the cross-car direction to provide the tray surface. The elongated panel 160 may extend between the first and second ends 80, 82 to cover the storage cavity 90 and may rotate to provide the tray or table.

Referring to FIG. 10, in an additional or alternative configuration, cover assembly 32 may include three panels 162, 164, 166, including a connector panel 162 and two opposing side panels 164, 166. In this way, the two side panels 164, 166 are configured to adjust to the folded state over the connector panel 162 and adjacent to one another and deploy to be on opposing sides of the connector panel 162 adjacent to the connector panel 162. Other configurations of the cover assembly 32 that translates along three movement paths 40, 42, 44 are contemplated without departing from the teachings herein.

Referring to FIGS. 1-10, the cover assembly 32 is configured to move along the three movement paths 40, 42, 44 when in the folded state and the deployed state. The occupants in the seating assemblies 64, 66 may adjust the cover assembly 32 to any position along each of the three movement paths 40, 42, 44, separately or in combinations, to provide a personalized position of the cover assembly 32. This is advantageous for providing the armrest, as well as the tray surface for the occupants in one or both seating assemblies 64, 66 in accordance with current technology and regulatory framework. The cover assembly 32 may be moved along any of the movement paths 40, 42, 44 in response to manual force applied by the occupants in the vehicle 12. The engagements between the sliders 100, 102 and the rails 22, 24, the connector assembly 36 and the track 30, and the support bar 28, the bearing, and the shaft 120 of the attachment bracket 110 are frictional engagements that allow the movement of the components relative to one another and retain the components in the select position when the manual force is not being applied.

Figure 11:
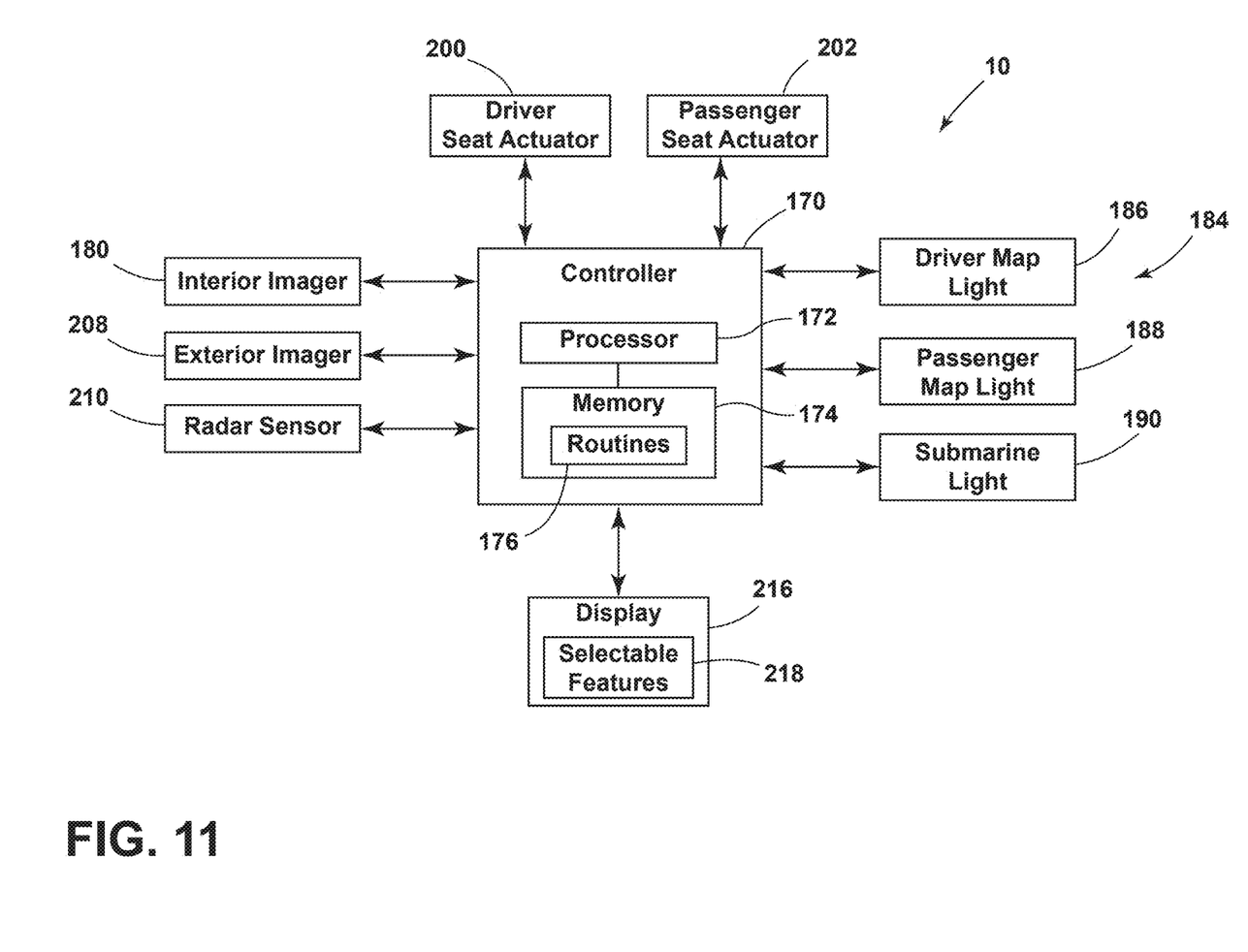
FIG. 11 is a block diagram of a console system for a vehicle, according to the present disclosure.

Referring to FIG. 11, as well as FIG. 1-10, the console assembly 14 is generally part of the console system 10 for the vehicle 12. The console system 10 provides different features used in combination with the console assembly 14. The vehicle 12 includes a controller 170, which is generally an electronic control unit for the vehicle 12. The controller 170 includes a processor 172, a memory 174, and other control circuitry. Instructions or routines 176 are stored within the memory 174 and executable by the processor 172. The controller 170 is in communication with a variety of features within the vehicle 12, which may be controlled (e.g., activated, deactivated, adjusted, etc.) in response to the state and/or position of the cover assembly 32.

For example, the vehicle 12 may include an interior imager 180. The interior imager 180 may be a charge coupled device, a complementary metal oxide semiconductor, or any type of camera. The interior imager 180 defines a field of view 182 that includes the console assembly 14. The field of view 182 may be sized and oriented to include the cover assembly 32 in each state and position. Additionally or alternatively, the interior imager 180 may have lenses or similar features that adjust the field of view 182. The interior imager 180 is configured to capture image data from the field of view 182 and communicate the image data to the controller 170.

The controller 170 generally includes image processing routines 176, which are configured to process and analyze the image data. Based on the image data, the controller 170 is configured to determine whether the cover assembly 32 is in the folded state or the deployed state, as well as the position of the cover assembly 32 along the movement paths 40, 42, 44. In this way, the controller 170 is configured to determine whether the cover assembly 32 moved in the vehicle-forward direction, is in one of the side positions, is positioned centrally or over one of the seating assemblies 64, 66, etc.

Referring still to FIG. 11, the controller 170 is generally configured to adjust functions of the vehicle 12 in response to the position or state of the cover assembly 32. For example, when the cover assembly 32 is in the deployed state, the controller 170 may prevent the vehicle 12 from being activated or shifted into a drive state. In this way, the controller 170 is configured to "lockout" the vehicle 12 in response to the state of the cover assembly 32. The vehicle 12 may be "locked out" of the drive state when the cover assembly 32 is in the deployed state regardless of the position of the cover assembly 32 (e.g., first side position v. second side position).

Additionally or alternatively, the controller 170 may "lockout" the vehicle 12 from the drive state when the state and position of the cover assembly 32 are indicative of the occupant in the driver seat 64 using the tray surface. In this way, when the cover assembly 32 is in the deployed state and in the first side position, the vehicle 12 may not be activated or adjusted into the drive state. This may also be true when the cover assembly 32 is in the second side position and shifted along the track 30 toward the first seating assembly 64 to provide the central tray surface. However, when the cover assembly 32 is in the deployed state and the second side position, extending over the second seating assembly 66, the vehicle 12 may be adjusted to the drive state. This configuration allows the occupant in the passenger seat 66 to use the tray surface in the moving vehicle 12, but not the occupant in the driver seat 64.

The conditions for when the controller 170 "locks" the vehicle 12 out of the drive state may be based on current technology and regulatory framework. It is contemplated that in the future technology and/or the regulatory framework may permit the use of the tray or table surface by an occupant in the first seating assembly 64 and/or the second seating assembly 66 while the vehicle 12 is in the driving state or moving. In such scenarios, the cover assembly 32 may be used in accordance with the current technology and regulatory framework.

Referring still to FIG. 11, the vehicle 12 generally includes multiple light sources 184 configured to illuminate areas around the console assembly 14 and/or the seating assemblies 64, 66. In the illustrated example, the light sources 184 include a driver map light 186 configured to emit light over the first seating assembly 64, a passenger map light 188 configured to emit light over the second seating assembly 66, and a submarine or overhead console light 190 configured to emit light over the console assembly 14.

In various examples, the light sources 184 are activated based on the position and/or state of the cover assembly 32. For example, when the cover assembly 32 is in the deployed state and the first side position, extending over the first seating assembly 64, the controller 170 is configured to activate the driver map light 186 to provide light on the tray surface over the first seating assembly 64. When the cover assembly 32 is in the deployed state and in the second side position, extending over the second seating assembly 66, the controller 170 is configured to activate the passenger map light 188 to provide light to the tray surface over the second seating assembly 66. When the cover assembly 32 is in the deployed state and providing a central tray surface (e.g., in the first side position and disposed in the track 30 proximate the second seating assembly 66 or in the second side position and disposed in the track 30 proximate the first seating assembly 64), the controller 170 is configured to activate the overhead console light 190 to provide lighting for the central tray surface. The light sources 184 may be activated at different intensities based on the type of light sources 184, the time of day, the available light determined by the interior imager 180 or other light sensors, etc.

With further reference to FIG. 11, the controller 170 may be configured to adjust a position of one or both of the seating assemblies 64, 66 in response to the state and/or position of the cover assembly 32. Each of the seating assemblies 64, 66 includes an actuator 200, 202 or multiple actuators 200, 202 configured to adjust the respective seating assembly 64, 66. The actuators 200, 202 are generally configured to adjust the respective seating assembly 64, 66 in the fore-aft direction, vertically, angle of a seat base, and/or angle of a seat back. When the controller 170 determines that the cover assembly 32 is in the deployed state providing the central tray surface, the controller 170 may be configured to adjust one or both of the seating assemblies 64, 66 forward and/or upright to a task orientation or work position, providing better access to the center tray surface. When the cover assembly 32 is in the deployed state in the first side position, the controller 170 may be configured to adjust the first seating assembly 64 forward and upright to provide the task orientation. Similarly, for the second seating assembly 66, when the cover assembly 32 is in the second side position and the deployed state, the second seating assembly 66 may be adjusted forward and upright to the task orientation. Accordingly, the controller 170 may automatically adjust the seating assembly 64, 66 for the occupant who is using the tray surface to provide better or increased access to the tray surface.

According to various aspects, the vehicle 12 may include one or both of an exterior imager 208 and a radar sensor 210. Each of the exterior imager 208 and the radar sensor 210 may be coupled to a vehicle-forward portion of the vehicle 12 and have a field of view extending in a vehicle-forward direction to capture data and communicate the data to the controller 170. Using the data from one or both of the exterior imager 208 and the radar sensor 210, the controller 170 may be configured to determine whether objects, such as a people or other vehicles 12, are approaching the vehicle 12, the distance of the objects, and/or the speed of the objects.

The controller 170 is in communication with a display 216 of the center stack 70. The controller 170 may be configured to display the information from the exterior imager 208 and/or the radar sensor 210 on the display 216 for the occupant in the interior compartment 60 to view. The displayed information may be received data, such as image data, and/or processed information, such as a notification of a person detected within the field of view and at what distance is the person. This may be advantageous for the occupant utilizing the cover assembly 32 in the deployed state as the tray to notify the occupant of an approaching person. For example, the occupant working at a mobile workstation provided by the tray or eating lunch may desire to be alerted when someone is approaching that may wish to speak to the occupant.

Referring again to FIG. 1 and to FIG. 11, when the cover assembly 32 is moved toward the vehicle-forward second end 82 of the console assembly 14, whether in the folded state or the deployed state, the cover assembly 32 may extend over the control buttons 88 on the upper rim 86 of the body 16. When the controller 170 determines that the console assembly 14 is positioned over the control buttons 88 and, therefore, likely impeding access to the control buttons 88, the controller 170 is configured to display selectable control features 218 on the display 216 that correspond with the covered control buttons 88. For example, if the control buttons 88 adjust heating in the seating assemblies 64, 66, the control features 218 on the display 216 are configured to adjust the heating in the seating assemblies 64, 66. When the cover assembly 32 is moved in the vehicle-rearward direction, uncovering the control buttons 88, the controller 170 may remove the control features 218 from the display 216. In this way, the user does not have to readjust the cover assembly 32 to control certain features and the controls remain readily accessible.

Referring to FIGS. 1-11, the cover assembly 32 is configured to be utilized in the folded state as the armrest and the deployed state as the table or tray. The cover assembly 32 is configured to translate along the first movement path 40 in the fore-aft direction, which may occur while the cover assembly 32 is in the folded state or the deployed state, as well as in the center position and the side positions. In this way, the deployed tray over one of the seating assemblies 64, 66 may be adjusted for the position preference of the occupant. The cover assembly 32 is also configured to translate along the second movement path 42 in the cross-car direction. The cover assembly 32 may move along the second movement path 42 when in the folded state or the deployed state, as well as in the center position and the side positions. Further, the cover assembly 32 is configured to rotate about the vertical axis 122 and move the cover assembly 32 along the third movement path 44 between the first side position and about 180 degrees to the second side position. The cover assembly 32 is configured to translate along the same horizontal plane as the cover assembly 32 moves along the first movement path 40, the second movement path 42, and the third movement path 44.

The cover assembly 32 may provide a mobile workstation, which may be advantageous for providing space for an occupant of the vehicle 12 to work or provide a place to eat lunch while at a worksite while the vehicle 12 is parked and stationary. The cover assembly 32 is utilized within the current technology and regulatory framework, which in the future could include the use of the cover assembly 32 as the tray in the moving vehicle 12 for one or both of the occupants in the seating assemblies 64, 66. The cover assembly 32 is also configured to be used in conjunction with other features of the vehicle 12 as described herein to maximize the user experience with the cover assembly 32.

The vehicle 12 is a wheeled motor vehicle 12, which may be a sedan, a sport-utility vehicle, a truck, a van, a crossover, and/or other styles of vehicle 12. The vehicle 12 may be a manually operated vehicle 12 (e.g., operated with a human driver), a fully autonomous vehicle 12 (e.g., operated without a human driver), or a partially autonomous vehicle 12 (e.g., operated with or without a human driver). Additionally, the vehicle 12 would be utilized for personal and/or commercial purposes, such as ride providing services (e.g., chauffeuring) and/or ridesharing services.

Use of the present device may provide for a variety of advantages. For example, the cover assembly 32 may be utilized to cover and uncover the storage cavity 90 in the console assembly 14. Additionally, the cover assembly 32 is configured to translate along three different movement paths 40, 42, 44 to provide a variety of positions and orientations of the cover assembly 32 relative to the body 16, as well as the occupants in the adjacent seating assemblies 64, 66. Also, the cover assembly 32 is configured to translate fore-and-aft, translate in the cross-car direction, and rotate. Further, the cover assembly 32 is configured to be utilized in the folded state as the armrest and in the deployed state to provide the table or tray surface. Moreover, the console assembly 14 and cover assembly 32 may provide a mobile workstation that may be utilized within current technological and regulatory frameworks. Further, the console system 10 maximizes the user experience with the cover assembly 32 by adjusting lighting, seating position, and displayed information on the display 216 when the cover assembly 32 is in select states or positions. Additional benefits or advantages may be realized and/or achieved.

The device disclosed herein is further summarized in the following paragraphs and is further characterized by combinations of any and all of the various aspects described therein.

According to various examples, a vehicle console system includes a body having first and second sidewalls. Each of the first and second sidewalls defines a rail along an inner surface thereof. A support bar slidably engages the rails. The support bar defines a track. A cover assembly is operably coupled to the support bar. The cover assembly includes a base panel coupled to the support bar via a connector assembly and a deployable panel rotatably coupled to the base panel. The cover assembly is configured to translate along a first movement path with the support bar along the rails and a second movement path along the track of the support bar. The cover assembly is configured to rotate along a third movement path between a first side position and a second side position. Embodiments of the present disclosure may include one or a combination of the following features:

- the deployable panel is operable between a folded armrest state positioned on an upper surface of the base panel and a deployed tray state adjacent to the base panel;
- the cover assembly is configured to rotate 90 degrees in a first direction from a center position to the first side position and 90 degrees in a second direction from a center position to the second side position;
- the deployable panel is coupled to the base panel via hinges;
- the hinges are disposed in a console-forward direction when the cover assembly is in the center position;
- an interior imager defining a field of view including the cover assembly;
- the interior imager is configured to capture image data within the field of view;
- a controller communicatively coupled to the interior imager;
- the controller is configured to determine when the cover assembly is in a deployed tray state based on the image data;
- a light source communicatively coupled to the controller;
- the controller is configured to activate the light source when the cover assembly is in the deployed tray state;
- a display communicatively coupled to the controller;
- the console assembly includes control buttons at an end thereof; and
- selectable control features are configured to be displayed on the display when the cover assembly is positioned over the control buttons.

According to various examples, a vehicle console assembly includes a body defining a storage cavity between first and second sidewalls. A support bar coupled to each of the first and second sidewalls. The support bar defines a track extending between the first and second sidewalls. A cover assembly is operably coupled to the support bar. The cover assembly includes a first panel. A second panel is rotatably coupled to the first panel. The second panel is operable between a folded state and a deployed state. A connector assembly is coupled to a lower surface of the first panel and extends through the track of the support bar. The cover assembly is configured to rotate in a first direction from a center position to a first side position and in a second direction from the center position to a second side position. The cover assembly is configured to translate along the track. Embodiments of the present disclosure may include one or a combination of the following features:

- the first and second sidewalls each define a rail;
- the support bar is configured to translate along the rails;
- the cover assembly is configured to translate along a first movement path defined by the rails and a second movement path defined by the track, the second movement path being normal to the first movement path;
- the cover assembly is configured to translate along a single plane when translating along the first movement path, the second movement path, and when rotating between the first and second side positions;
- the cover assembly is configured to rotate about a vertical axis between the first side position, the center position, and the second side position;
- the cover assembly includes padding coupled to the second panel to provide an armrest when the second panel is in the folded state;
- the first panel is disposed at least partially over the storage cavity when the cover assembly is in the folded state and the deployed state;
- the second panel is disposed proximate the first sidewall when the cover assembly is in the deployed state in the first side position;
- the second panel is disposed proximate the second sidewall when the cover assembly is in the deployed state in the second side position; and
- a surface of the second panel is coplanar with an upper surface of the first panel when the cover assembly is in the deployed state to form a tray.

According to various examples, a console assembly for a vehicle includes a body having sidewalls. Each sidewall defines a rail. A support bar slidably engages the rails. The support bar defines a track. A cover assembly is operably coupled to the support bar. A connector assembly is coupled to the cover assembly and engages the support bar. The cover assembly is configured to translate along a first movement path with the support bar via the rails, translate along a second movement path along the track via the connector assembly, and rotate about a vertical axis along a third movement path via the connector assembly. Embodiments of the present disclosure may include one or a combination of the following features:

- the cover assembly includes a deployable panel rotatably coupled to a base panel;
- the deployable panel is operable between a folded state over the base panel and a deployed state adjacent to the base panel;
- the cover assembly is configured to rotate 180 degrees when translating along the third movement path between a first side position and a second side position; and
- the first movement path is normal to the second movement path.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle console system, comprising:
    a body having first and second sidewalls, wherein each of the first and second sidewalls defines a rail, respectively, along an inner surface thereof;
    a support bar slidably engaging the rails, wherein the support bar defines a track;
    a cover assembly operably coupled to the support bar, wherein the cover assembly includes:
        a base panel coupled to the support bar via a connector assembly; and
        a deployable panel rotatably coupled to the base panel and operable between a folded armrest state positioned on an upper surface of the base panel and a deployed tray state adjacent to the base panel, wherein the cover assembly is configured to translate along a first movement path with the support bar along the rails and a second movement path along the track of the support bar, wherein the cover assembly is configured to rotate along a third movement path between a first side position and a second side position, and wherein when the deployable panel is in the deployed tray state, the base panel extends at least partially over the body and the deployable panel extends at least partially over a first seating assembly when in the first side position and extends at least partially over a second seating assembly when in the second side position.

2. The vehicle console system of claim 1, wherein the cover assembly is configured to rotate 90 degrees in a first direction from a center position to the first side position and 90 degrees in a second direction from the center position to the second side position.

3. The vehicle console system of claim 2, wherein the deployable panel is coupled to the base panel via hinges, and wherein the hinges are disposed in a console-forward direction when the cover assembly is in the center position.

4. The vehicle console system of claim 1, further comprising:
    an interior imager defining a field of view including the cover assembly, wherein the interior imager is configured to capture image data within the field of view; and
    a controller communicatively coupled to the interior imager, wherein the controller is configured to determine when the cover assembly is in the deployed tray state based on the image data.

5. The vehicle console system of claim 4, further comprising:
    a light source communicatively coupled to the controller, wherein the controller is configured to activate the light source when the cover assembly is in the deployed tray state.

6. The vehicle console system of claim 4, further comprising:
    a display communicatively coupled to the controller, wherein the console assembly includes control buttons at an end thereof, and wherein selectable control features are configured to be displayed on the display in response to the cover assembly being positioned over the control buttons.

7. The vehicle console system of claim 4, wherein the first seating assembly has a seat actuator, the seat actuator being in communication with the controller, and wherein the seat actuator is configured to adjust the first seating assembly to a task orientation when the cover assembly is in the deployed tray state.

8. A vehicle console assembly, comprising:
    a body defining a storage cavity between first and second sidewalls;
    a support bar coupled to each of the first and second sidewalls, wherein the support bar defines a track extending between the first and second sidewalls; and a cover assembly operably coupled to the support bar, wherein the cover assembly includes:
  a first panel;
  a second panel rotatably coupled to the first panel, wherein the second panel is operable between a folded state and a deployed state; and
  a connector assembly coupled to a lower surface of the first panel and extending through the track of the support bar, wherein the cover assembly is configured to rotate in a first direction from a center position to a first side position and in a second direction from the center position to a second side position, and wherein the cover assembly is configured to translate along the track.

9. The vehicle console assembly of claim 8, wherein the first and second sidewalls each define a rail, and wherein the support bar is configured to translate along the rails, and wherein the cover assembly is configured to translate along a first movement path defined by the rails and a second movement path defined by the track, the second movement path being normal to the first movement path.

10. The vehicle console assembly of claim 9, wherein the cover assembly is configured to translate along a single plane when translating along the first movement path, the second movement path, and when rotating between the first and second side positions.

11. The vehicle console assembly of claim 8, wherein the cover assembly is configured to rotate about a vertical axis between the first side position, the center position, and the second side position.

12. The vehicle console assembly of claim 8, wherein the cover assembly includes padding coupled to the second panel to provide an armrest when the second panel is in the folded state.

13. The vehicle console assembly of claim 8, wherein the first panel is disposed at least partially over the storage cavity when the cover assembly is in the folded state and the deployed state.

14. The vehicle console assembly of claim 8, wherein the second panel is disposed proximate the first sidewall when the cover assembly is in the deployed state in the first side position, and wherein the second panel is disposed proximate the second sidewall when the cover assembly is in the deployed state in the second side position.

15. The vehicle console assembly of claim 8, wherein a surface of the second panel is coplanar with an upper surface of the first panel when the cover assembly is in the deployed state to form a tray.

16. A console assembly for a vehicle, comprising:
  a body having sidewalls, wherein each sidewall defines a rail;
  a support bar slidably engaging the rails, wherein the support bar defines a track;
  a cover assembly operably coupled to the support bar; and
  a connector assembly coupled to a lower surface of the cover assembly and extending into the track of the support bar, wherein the cover assembly is configured to translate along a first movement path with the support bar via the rails, translate along a second movement path along the track via the connector assembly, and rotate about a vertical axis along a third movement path via the connector assembly.

17. The console assembly of claim 16, wherein the first movement path is normal to the second movement path.

18. The console assembly of claim 6, wherein the selectable control features correspond with the covered control buttons.

19. The console assembly of claim 16, wherein the rails are elongated slots extending along inner surfaces of the sidewalls, respectively, wherein the support bar extends into each of the rails, and wherein the cover assembly is disposed above each of the rails.

20. The console assembly of claim 16, wherein the connector assembly includes a shaft extending through the track of the support bar, and wherein a bushing is placed over the shaft.

\* \* \* \* \*